2,911,340

STABILIZATION OF CHLOROANILINES UNDER THERMAL STRESS

Richard Crawford Franklin and John Randolph McCarthy, Wilmington, Del., assignors to E. I. du Pont de Nemours and Company, Wilmington, Del., a corporation of Delaware No Drawing. Application May 6, 1957
Serial No. 657,028

3 Claims. (Cl. 202—57)

This invention relates to an improved method of minimizing the thermal decomposition of chloro-substituted aromatic amines, particularly chloroanilines, during their recovery or purification by distillation.

The chlorinated aromatic amines have a wide variety of uses in the chemical industry. They are particularly valuable intermediates for agricultural and pharmaceutical chemicals and for pigments and dyes. For example, from p-chloroaniline and 3,4-dichloroaniline are produced ureas having pronounced herbicidal activity.

The monochloroanilines are generally prepared commercially by reduction of the corresponding nitro compounds, which in turn are obtained either by nitration of chlorobenzene or by chlorination of nitrobenzene. In these processes it is often desirable to distill the products either for the purpose of purification or for the purpose of separating from isomers. Such distillations, however, are often difficult and costly when done on a large scale because of the thermal instability of these substances. Whereas losses due to decomposition are negligible with such aromatic amines as aniline and the toluidines, they are considerable with the monochloroanilines and dichloroanilines. Furthermore, the operation is hazardous. Under conditions of temperature and pressure that are normally employed for substances of like volatility, the chloroanilines react to yield higher molecular weight products (obtained as residues or tars) with liberation of hydrogen chloride. This reaction is generally spoken of in the plant as "decomposition" (although strictly speaking it is a condensation), and this term shall be understood in this sense throughout this specification. Hydrogen chloride is corrosive to the equipment and catalyzes further decomposition, which if not controlled can become explosive. This problem is particularly acute on a commercial scale where tar residues are excessive primarily because of the necessarily long times required to process the large quantities involved and because of the harmful effect of iron on the decomposition, iron being the material of choice for reasons of economy in the construction of plant equipment.

Heretofore, a common expedient has been to add soda ash to the still charge to neutralize the hydrogen chloride formed, as for example in the fractional distillation of the crude monochloroaniline obtained by iron-reduction of mononitrated chlorobenzene and which consists essentially of the o- and p-isomers. Use of soda ash, however, has several disadvantages: It is insoluble in the organic amine; it tends to settle out and become coated with side products and thus become ineffective. It is non-volatile and therefore affords no protection to upper parts of the still, as in the heated distillation column where decomposition may also occur. Furthermore, the effectiveness of sodium carbonate for the purpose on hand is not entirely satisfactory, and considerable quantities of tarry residues accumulate even where soda ash is used.

The said residues are difficult to remove. Ordinary cleaning procedures such as heating of the residue with by-product chloroanilines and treatment with steam or hot water are incompletely effective, and periodically the still has to be dismantled for manual cleansing which is costly and hazardous because the chloroanilines are extremely cyanotic. As a result, shutdowns are frequent and production schedules are hard to meet.

It is accordingly an object of this invention to improve the stability of chloroanilines against decomposition under thermal stress. Another object is to improve the efficiency and safety of the process of distilling mixtures of the monochloroanilines. Additional objects and achievements of this invention will appear as the description proceeds.

Now, according to this invention, these objects are accomplished by employing a polyalkylene polyamine as a stabilizer for the chloroanilines when under thermal stress. More particularly, we add to the distillation mass a polyalkylene polyamine, such as triethylene tetramine or tetraethylenepentamine, in quantity of between 0.1 and 5% by weight based on the initial weight of the chlorinated aromatic amine being distilled.

The polyalkylene polyamine may be used by itself or in conjunction with an alkali-metal carbonate, in which event the quantity of the former may be kept close to the lower limit above indicated. We find that when a mixture of say 1 to 5% of sodium carbonate (based on the weight of the charge) and about 0.4 to 0.6% of the polyalkylene polyamine (on the same basis) is employed, their joint effect in reducing the quantity of tarry sediments formed is surprisingly high. Moreover, the residues are less tarry and are easier to remove than when soda-ash alone is used.

The polyalkylene polyamine selected should preferably be less volatile than the amines of the mixture being distilled, so that it will remain behind in the still as the chlorinated anilines distill over. At the same time, it should possess sufficient volatility to reach the upper parts of the distillation equipment, so as to prevent decomposition there, too. Tetraethylenepentamine and triethylenetetramine have proven to be particularly satisfactory from these several viewpoints.

The quantities of polyalkylene polyamine to be added will depend largely upon the operation to be carried out and the extent of thermal decomposition normally encountered in that operation. The extent of thermal decomposition depends upon the particular chloroaniline, its purity, and the severity of conditions such as temperature, exposure time, presence or absence of promoters of decomposition such as iron and its salts, and therefore these factors should be considered in selecting the stabilizing quantity of a given polyalklene polyamine.

The usual operating temperatures are in excess of 100° C. and below 200° C. For example, with crude monochloroanilines consisting essentially of mixed p- and o- isomers and lesser amounts of other and higher chlorinated anilines it is preferred not to exceed still pot temperatures of about 180° C. During these distillations, of course, the pressures are chosen according to the vapor pressure-temperature relationships of the compounds being distilled.

The time factor becomes particularly important in large scale operations because of the deleterious effects of hydrogen chloride and of iron (when such equipment is employed). It is not unusual to find that a number of days are required to complete large scale batch distillations, during which the charge in the still is continually subjected to conditions favoring its decomposition. The beneficial effect of the polyalkylene polyamine stabilizer is especially apparent under such severe operating conditions. Quantities of this agent between about 0.1 and 0.5% (based on the weight of the chloroaniline mixture) have been found to be as effective as about 2% of soda ash. Nevertheless, for maximum effectiveness and safety, it is recommended to use between 0.5 and 5% of the polyalkylene polyamine (based on the weight of the charge), if used alone.

Quantities higher than about 5% are operable, but are unnecessary and wasteful, inasmuch as recovery of the stabilizer by distillation, though feasible, is costly. It may be noted that during the distillation process the polyalkylene polyamine, since it is higher boiling than the chloroaniline being distilled, accumulates in the still and, therefore, increasing concentrations of stabilizer are available to counteract the effects of increasing exposure time.

Without limiting this invention, the following examples are given to illustrate our preferred mode of operation. Parts mentioned are by weight.

*Example 1*

A mixture of monochloroanilines (56,640 lbs.), which had been prepared by mononitration of monochlorobenzene followed by iron reduction of the crude product was charged to an iron still having a capacity of 12,000 gallons and containing 2000 lbs. of soda ash and 3000 lbs. of water. Then 375 lbs. of tetraethylenepentamine was added, vacuum was applied and the charge heated with steam coils. After the water was removed, o-chloroaniline was fractionally distilled from the charge through a column at a reflux ratio of 15:1. When o-chloroaniline had been removed and pure p-chloroaniline started to distill over, the reflux ratio was reduced and the distillation was continued to a maximum still body temperature of 180° C. until no more product distilled. A total of 33,886 lbs. of p-chloroaniline, freezing point 68.5° C., was collected. Over-all time for the distillation was six days, and during this time there were no apparent signs of decomposition, e.g., no HCl evolution. The distillation residue was readily removed from the body of the still with by-product chloroaniline, live steam and water.

Identical results were obtained in a total of twenty-two similarly-scaled plant distillations of the monochloroanilines. There was no evidence of the formation of free hydrogen chloride and the charge in the still remained alkaline throughout the distillation.

In contrast to the above results, similarly-scaled plant distillations of the monochloroaniline mixture in which soda ash, but no tetraethylenepentamine was employed, were hazardous and operationally difficult. Runaway decomposition occurred in some cases, causing extensive damage to the equipment. Careful supervision of the charge with frequent additions of further quantities of soda ash was required in other cases. In most cases, still residues were large and required considerable time and labor to remove.

The effectiveness of the various agents herein discussed, by themselves or in mutual admixture, is brought out further by the following examples, which were run under conditions simulating the severity of large scale plant distillation.

*Example 2*

Mixtures of 300 parts of monochloroaniline (prepared as in Example 1) and of quantities of stabilizers as indicated in the table below, were heated in glass equipment to 180° C. to remove traces of water and low boiling materials. Iron in the form of nails was then introduced into the vessel, and the mass was heated at 175° to 185° C. (still pot temperature) for eighty hours. At the end of this period, the condenser was set for distillation and the charge was distilled under reduced pressure to remove all components boiling up to 180° C. at 3–5 mm. of Hg pressure. The residue was weighed, corrected for non-volatile stabilizer, and calculated as weight percent of the starting chloroaniline.

The results obtained with tetraethylenepentamine (TEPA), soda ash, mixtures thereof, and with triethylenetetramine (TETA) admixed with soda ash are tabulated below.

| Test | Stabilizer (percent based on total charge) | Residue (percent) |
| --- | --- | --- |
| 1 | None | 32.4 |
| 2 | 2% soda ash | 4.1 |
| 3 | 2% TEPA | 0.5–0.25 |
| 4 | 0.5% TEPA | 3.0 |
| 5 | 0.1% TEPA | 7.0 |
| 6 | 2% soda ash + 2% TEPA | 0.5 |
| 7 | 2% soda ash + 0.5% TEPA | 1.0 |
| 8 | 2% soda ash + 0.5% TETA | 2.3 |

It will be understood that the details of the above examples may be varied within the skill of those engaged in this art. Thus, in lieu of soda ash, potassium carbonate may be employed. Where the case requires it, somewhat lower temperatures, say 150° to 170° C., at correspondingly higher vacuum may be employed. While the above examples illustrate the invention particularly with reference to a mixture of p- and o-chloroaniline, the same process may be applied also to the distillation of m-chloroaniline, produced for instance by chlorinating nitrobenzene to the monochloro stage and then reducing with iron or with aqueous alkali sulfides. Substantial improvement is likewise obtained when this invention is applied to chlorotoluidines and dichloroanilines prepared by mononitration of the corresponding chlorinated hydrocarbons, followed by reduction with iron and hydrochloric acid. In the latter case, lower temperatures as above indicated are particularly recommended.

We claim as our invention:

1. A process of distilling a chloro-substituted aromatic amine of the group consisting of the monochloroanilines, dichloroanilines and chlorotoluidines on a commercial scale, in iron equipment and at a temperature between 100° and 200° C., which comprises effecting said distillation in the presence of a polyalkylene polyamine of the group consisting of triethylene tetramine and tetraethylene pentamine, the quantity of said polyamine being not less than 0.1% and not more than 5% by weight of said chloro-substituted aromatic amine, whereby the formation of tarry by-products in the still as a result of condensation of part of said chloro-substituted aromatic amine is substantially eliminated.

2. A process as in claim 1, wherein an alkalimetal carbonate is present in the reaction mass in quantity ranging from 1 to 5% by weight of said chloro-substituted aromatic amine, and the quantity of said polyalkylene polyamine present in the reaction mass is between 0.4 and 0.6% by weight on the same basis.

3. A process of distilling monochloroaniline on a commercial scale, in iron equipment, and at a temperature between 175° and 185° C., which comprises effecting said distillation in the presence of soda ash and of a polyalkylene polyamine of the group consisting of triethylene tetramine and tetraethylene pentamine, the quantity of soda ash being about 2% by weight of the monochloroaniline, and that of the polyalkylene polyamine being about 0.5% by weight on the same basis, whereby the formation of tarry by-products in the still as a result of condensation of part of said monochloroaniline is substantially eliminated.

References Cited in the file of this patent

UNITED STATES PATENTS

| | | |
| --- | --- | --- |
| 2,339,340 | Franz | Apr. 30, 1946 |
| 2,447,615 | Jones | Aug. 24, 1948 |
| 2,458,049 | Bloch et al. | Jan. 4, 1949 |
| 2,547,504 | Steahly | Apr. 3, 1951 |
| 2,628,934 | Raley et al. | Feb. 17, 1953 |
| 2,638,441 | Nixon et al. | May 12, 1953 |
| 2,681,935 | Thompson | June 22, 1954 |
| 2,696,473 | Sokol | Dec. 7, 1954 |
| 2,755,235 | Governale | July 17, 1956 |

UNITED STATES PATENT OFFICE

CERTIFICATE OF CORRECTION

Patent No. 2,911,340                                              November 3, 1959

Richard Crawford Franklin et al

It is hereby certified that error appears in the printed specification of the above numbered patent requiring correction and that the said Letters Patent should read as corrected below.

Column 4, line 67, references cited list, under UNITED STATES PATENTS, for the patent number "2,339,340" read -- 2,399,340 --.

Signed and sealed this 26th day of April 1960.

(SEAL)
Attest:

KARL H. AXLINE
Attesting Officer

ROBERT C. WATSON
Commissioner of Patents